(12) United States Patent
LeFevre et al.

(10) Patent No.: US 8,091,503 B2
(45) Date of Patent: Jan. 10, 2012

(54) LABEL CONFIGURED TO INDICATE AN OBJECT REACHING A PREDETERMINED TEMPERATURE

(75) Inventors: Jason M. LeFevre, Penfield, NY (US); Michael J. Severn, Rochester, NY (US); Michael J. Levy, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 88 days.

(21) Appl. No.: 12/549,262

(22) Filed: Aug. 27, 2009

(65) Prior Publication Data

US 2011/0048312 A1 Mar. 3, 2011

(51) Int. Cl.
 *G01K 11/12* (2006.01)
 *G01K 11/06* (2006.01)
 *B65D 81/34* (2006.01)

(52) U.S. Cl. .................. 116/217; 116/216; 374/162

(58) Field of Classification Search .................. 116/207, 116/216, 217, 219; 374/106, 161, 162; 422/55, 422/56, 58, 60
See application file for complete search history.

(56) References Cited

U.S. PATENT DOCUMENTS

| | | | | |
|---|---|---|---|---|
| 4,786,773 A | * | 11/1988 | Keefer | 219/734 |
| 4,863,282 A | * | 9/1989 | Rickson | 374/162 |
| 4,933,525 A | * | 6/1990 | St. Phillips | 219/725 |
| 4,990,284 A | * | 2/1991 | Lauterbach et al. | 252/408.1 |
| 5,083,815 A | | 1/1992 | Scrymgeour et al. | |
| 5,175,031 A | | 12/1992 | Ochocki | |
| 6,594,927 B2 | * | 7/2003 | Witkowski | 40/310 |
| 6,712,996 B2 | | 3/2004 | Wu et al. | |
| 6,979,120 B1 | * | 12/2005 | Wolfe | 374/162 |
| 7,028,634 B1 | * | 4/2006 | Lee | 116/207 |
| 2008/0034628 A1 | * | 2/2008 | Schnuckle | 40/310 |
| 2008/0232427 A1 | * | 9/2008 | Leute et al. | 374/161 |
| 2009/0050049 A1 | * | 2/2009 | Craig et al. | 116/217 |
| 2010/0285180 A1 | * | 11/2010 | Gaylor et al. | 426/88 |

FOREIGN PATENT DOCUMENTS

| | | | |
|---|---|---|---|
| EP | 69037 A1 | * | 1/1983 |
| JP | 10167342 A | * | 6/1998 |
| JP | 2005265822 A | * | 9/2005 |
| WO | WO 2007016131 A1 | * | 2/2007 |

\* cited by examiner

*Primary Examiner* — R. A. Smith

(74) *Attorney, Agent, or Firm* — Maginot, Moore & Beck, LLP

(57) ABSTRACT

An apparatus indicates a temperature of an object. The apparatus includes a porous substrate, a mirror image of a first image pattern printed with a first phase-change ink having a first phase change temperature on a first side of the porous substrate, and an adhesive layer applied to the first side of the porous substrate to enable the porous substrate to be affixed to an object.

15 Claims, 4 Drawing Sheets

LABEL CONFIGURED TO INDICATE AN OBJECT REACHING A PREDETERMINED TEMPERATURE

TECHNICAL FIELD

The devices and methods disclosed below generally relate to temperature indicating systems, and, more particularly, to systems that use indicia to provide indications of an object's temperature.

BACKGROUND

Food packages that are heated to prepare their contents for consumption are known. For example, some foods, such as popcorn, are packaged in bags that are placed within a microwave oven for heating. As the popcorn kernels are heated and pop, the bag expands. Sometimes the contents in these packages may be overheated or insufficiently heated because the consumer does not know when the package has reached an appropriate temperature for consumption of the contents. Displaying a message to indicate to a consumer when the package and its contents have reached a predetermined temperature is a desirable goal.

In U.S. Pat. No. 5,083,815 to Scrymgeour et al. a popcorn bag is disclosed that reveals indicia for a number in a lottery type game in response to the bag. The number may be revealed in one of two ways. First, a user can scratch an opaque ink covering the number so the number can be observed. Second, the opaque ink is formulated to become transparent when heated to a predetermined temperature number. Thus, heating the bag enables the ink to reveal the underlying number printed on the bag. While the second method of revealing the number is based on changes in thermal characteristics of an object, it requires the bag to be printed with the number indicia in one type of ink and then be covered with the ink that changes properties to reveal the number when heated. Simplifying the bag manufacturing process to enable the bag or other object to indicate the package and contents are ready at a predetermined temperature remains a goal in the packaging industry.

SUMMARY

An apparatus for indicating temperature of an object has been developed. The apparatus includes a porous substrate, a mirror image of a first image pattern printed with a first phase-change ink having a first phase change temperature on a first side of the porous substrate, and an adhesive layer applied to the first side of the porous substrate to enable the porous substrate to be affixed to an object.

A method has also been developed for manufacturing an object capable of indicating a temperature of the object. The method includes printing a first phase-change ink on a first side of a porous substrate to form a mirror image of a first image pattern, applying adhesive to the first side of the porous substrate, affixing the porous substrate to an object with the adhesive, the mirror image printed on the first side being interposed between the porous substrate and the object.

BRIEF DESCRIPTION OF THE DRAWINGS

The foregoing aspects and other features of the present disclosure are explained in the following description, taken in connection with the accompanying drawings.

DETAILED DESCRIPTION

Figure 1:
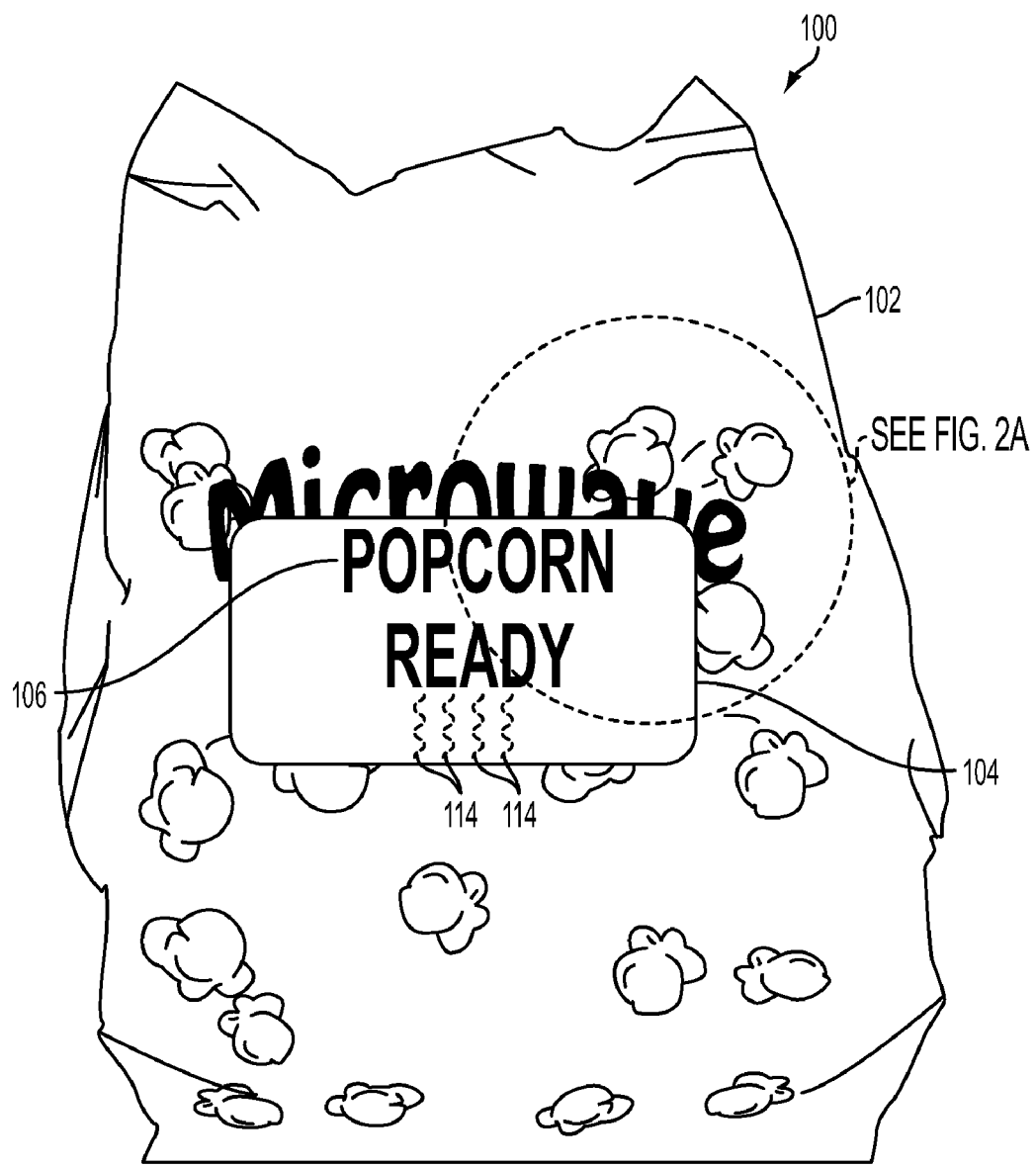
FIG. 1 is a schematic diagram of a temperature sensing system in accordance with one embodiment.
Figure 2A:
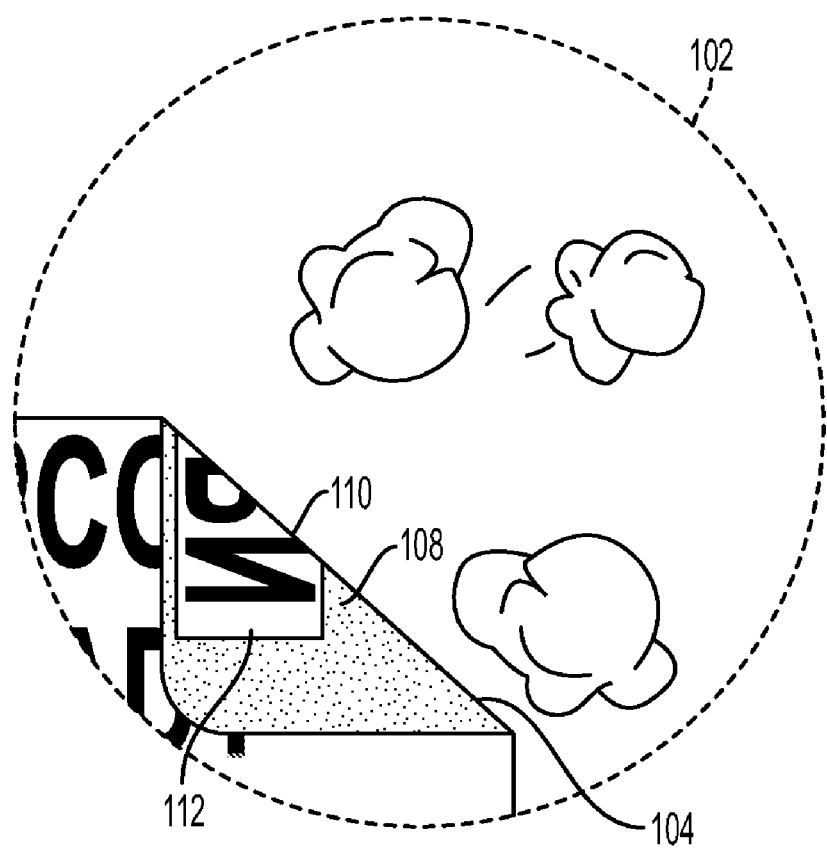
FIG. 2A is a schematic diagram depicting an enlarged potion of the temperature sensing system depicted in FIG. 1.
Figure 2B:
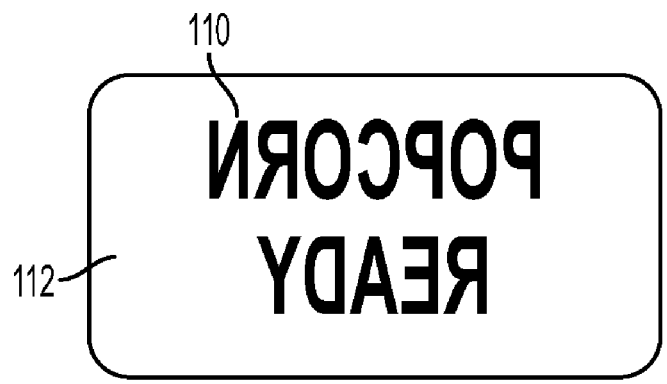
FIG. 2B is a schematic diagram depicting a mirror image pattern printed on a backside of a porous substrate.

Referring to FIGS. 1, 2A and 2B, a temperature indicating system 100 is depicted after an object has reached a predetermined temperature that activates the indicia. The system 100 includes an object 102 and a porous substrate 104 onto which an image pattern 106 has been printed with phase change ink in a manner described in more detail below. In brief, the porous substrate 104 is printed with the image pattern 106 in a mirror image configuration and covered with an adhesive. The adhesive is used to attach the porous substrate 104 to the object 102 so the unprinted side of the porous substrate 104 is exposed at the surface of the object 102 and the image pattern 106 is interposed between the substrate 104 and the object 102. Upon heating the object 102 to a predetermined temperature, the phase change ink becomes liquid and is absorbed by the porous substrate 104 to reveal the readable image pattern 106 shown in FIG. 1.

An enlarged depiction of a corner of the porous substrate 104 is provided in FIG. 2A. A portion of the porous substrate 104 is pulled back to reveal a portion of the surface of the object 102 underlying the substrate 104. Surrounding the printed area in which the mirror image 110 of the image pattern 106 has been printed is an adhesive layer 108. Although adhesive layer 108 is shown as surrounding the printed area for the mirror image 110, the adhesive layer 108 may covered the printed area provided the properties of the adhesive do not interfere with the phase change properties of the ink used to print the mirror image 110 or the ability of the ink to penetrate the substrate 104 once the ink melts. In one embodiment, the adhesive layer 108 is a material with a high thermal conductivity coefficient. The porous substrate 104, the phase-change ink forming the mirror image pattern 110, and the adhesive layer 108 are all materials that can flex while still retaining their intended properties.

The phase-change ink forming the mirror image pattern 110 can be formed to change phase at different phase-change temperatures. In one embodiment the change in phase from a solid to a liquid occurs at 110° C. This phase change ink may be used, for example, with a bag of the popcorn, as shown in FIG. 1, that reaches a temperature of 110° C. when the popcorn is ready. In other applications, e.g., a microwavable frozen food package, the object may be required to reach a temperature of 130° C. before the contents are ready. In this case the constituents of the phase change ink are selected to provide a phase-change ink that melts at a temperature of about 130° C.

The amount of time needed for the molten phase-change ink to bleed through the porous substrate is negligible. Consequently, only a small temperature increase may be experienced by the object 102 from the time the phase-change ink melts until the displayed image pattern 106 becomes visible to the user. If the slight increase in temperature for the object is objectionable, the components of the phase change ink may be selected to change phase at a temperature slightly below the preferred temperature for the contents of the object. Thus, by the time the ink bleeds through the substrate 104 to form the image pattern 106, the object 102 has achieved the desired temperature.

In a process for preparing the substrate 104 for use with an object, the phase-change ink is printed on the backside 112 of a porous substrate 104 using a solid inkjet printing technology. Solid ink is melted and ejected from a solid ink printing head to form the mirror image pattern 110 on the backside 112 of the substrate 104. The molten ink that is ejected from the print head immediately begins to cool as the ink travels toward the porous substrate 104. The temperature of the porous substrate 104 is cooler than the molten ink. Therefore, the ink sufficiently congeals on the porous substrate 104 that it is not absorbed by the substrate at the time of its printing. After the ink is ejected on to the substrate, the ink is affixed or pressed onto the substrate. In one embodiment, the porous substrate 104 can be a printing paper, e.g., 20 lbs strength paper, which is used in many commonplace printing applications.

Although a simple phrase ("POPCORN READY") is depicted in FIG. 1, any pattern can be printed on the backside 112 of the porous substrate 104. Also, while a black and white pattern is depicted in FIGS. 1 and 2, patterns of multi-color may also be printed using the same printing technology, e.g., the solid inkjet printing process. In case of a colored ink, interaction between the desired colors of the displayed image pattern 106 and the color of the porous substrate 104 must be taken into account.

As mentioned above, the mirror image pattern 110 is a mirror image of the displayed image pattern 106. An example of the mirror image pattern 110 is provided in FIG. 2B. The mirror image pattern 110 can be generated electronically by a computer, such as a digital front end (DFE) processor of a printing system. In one embodiment, depending on the application, the computer can be programmed to account for flexing and bending of the porous substrate 104 and accordingly generates a mirror image pattern 110 that produces the correct displayed image pattern 106.

Depicted in FIG. 1 are perforations 114 for releasing steam that may become trapped between the object 102 and the porous substrate 104. The steam may be formed from water droplets collected between the object 102 and the porous substrate 104. In particular, these water droplets may form due to condensation effects in cases where the object is cold or frozen prior to heating. For example, frozen food packages may enable small water droplets to form between the porous substrate 104 and the packaging of the food item. In response to the object 102 being heated, these droplets may result in steam. Trapped steam may result in a premature phase-change of the phase-change ink. The perforations 114 allow steam to escape, thereby allowing the phase-change ink to change phase in response to temperature of the object 102. However, given the porous nature of the porous substrate 104, perforations 114 may not be necessary in many applications. Additionally, in one embodiment, the phase-change ink is sufficiently hydrophobic that ink fails to dissolve or deform when the ink is in contact with moisture or water droplets.

Until the object 102 achieves the predetermined temperature, the phase-change ink forming the mirror image pattern 110 remains between the object 102 and the porous substrate 104. Thus, the mirror image pattern 110 remains substantially invisible to the user. Once the object 102 reaches the phase-change temperature of the phase-change ink and the phase-change ink melts and bleeds through the substrate, a slight modification may occur in the displayed image pattern 106 as the porous substrate 104 cools and the phase-change ink solidifies again. However, during this slight change, the displayed image pattern 106 continues to convey the intended message to the user.

The location of the porous substrate 104 on the object 102 can be strategically chosen to achieve the goal of providing an indication to a user at the time when the object 102 achieves the predetermined temperature. For example, in one application a central location on the object 102 may be the proper site for adhering the porous substrate 104 to the object 102, while in another application a different site, more indicative of the object's temperature, may be proper.

Figure 3A:
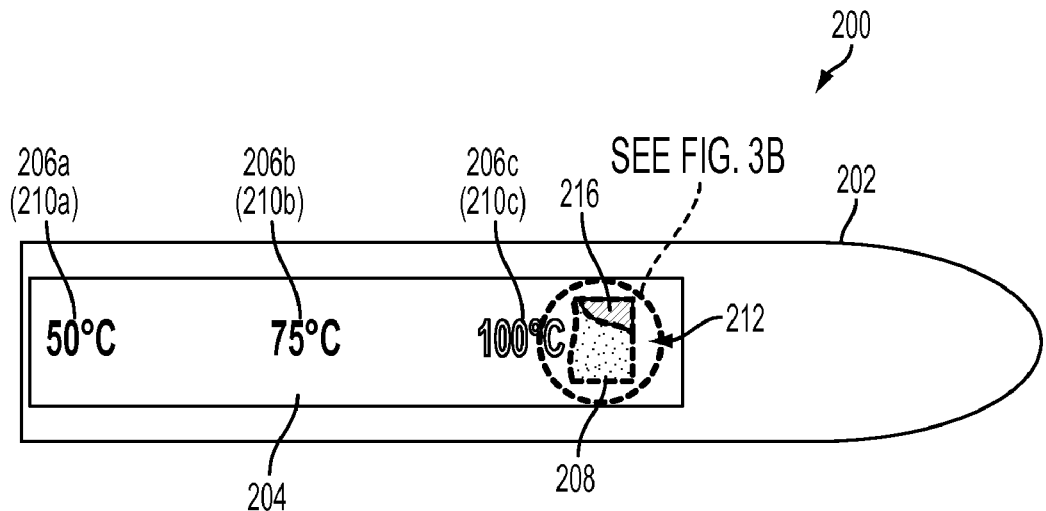
FIG. 3A is a schematic diagram of a temperature sensing system in accordance with one embodiment.
Figure 3B:
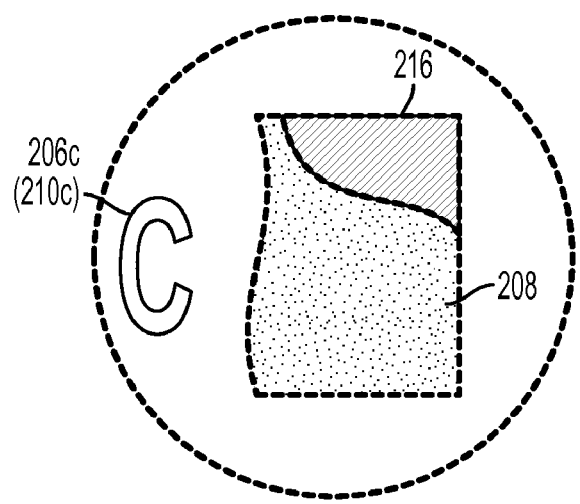
FIG. 3B is a schematic diagram depicting an enlarged potion of the temperature sensing system depicted in FIG. 3A.

Referring to FIG. 3A, a temperature sensing system 200 is depicted. A porous substrate 204 is adhered to an object 202. A series of displayed image patterns 206a, 206b, and 206c are depicted on the porous substrate 204. Also depicted in FIG. 3A is an adhesive layer 208 (shown as a phantom box, indicating a backside 212 of the porous substrate 204) that adheres the porous substrate 204 to the object 202. A series of mirror image patterns 210a, 210b, and 210c corresponding to the displayed image patterns 206a, 206b, and 206c are formed by a phase-change ink are printed on the backside 212 of the porous substrate 204. Different formulations of the phase change ink can be chosen to print the various mirror image patterns 210 for the different indications of temperatures. For example, while one phase-change ink material is selected to form a mirror image pattern 210a which generates a displayed image pattern 206a (i.e., to generate the pattern "50° C."), a different phase-change ink material is selected for generating a displayed image pattern 206b (i.e., to produce the pattern "75° C."). The object 202 in FIG. 3A is depicted to have just reached a phase-change temperature corresponding to the phase-change ink formulation used to form the mirror image pattern 210c, i.e., 100° C. The phase-change process is depicted to be in progress, as the displayed image pattern 206c is becoming visible on the porous substrate 204. Although not necessary in many applications, a thermally insulating layer 216 can be placed between the porous substrate 204 and the object 202. The thermally insulating layer 216 is depicted in a cutout of the backside 212 of the porous substrate 204, between the porous substrate 204 and the adhesive layer 208. The cutout for the thermally insulating layer 216 is also shown in phantom. The thermally insulating layer 216 can be used to apply the temperature sensing system 200 to an object regardless of the potential for the object's temperature. The thermally insulating layer must be chosen to provide the appropriate amount of thermal resistance between the body 202 and the phase-change ink so that the temperature to which the phase-change ink is subjected remains at or below the highest phase-change temperature. For clarity a portion of FIG. 3A is enlarged and depicted in FIG. 3B. In one embodiment, the adhesive layer 208 can also be used to provide the appropriate thermal insulation.

The object 202 of FIG. 3A can be any device where it is desirable to permanently memorialize that the device has reached different predetermined temperatures. For example, the object 202 can be an engine-head which can catastrophically warp when exposed to high temperatures. Generating permanent indications of temperatures to which the head has been subjected can be used by a subsequent buyer of the engine to evaluate whether the engine has ever been overheated.

Figure 4:
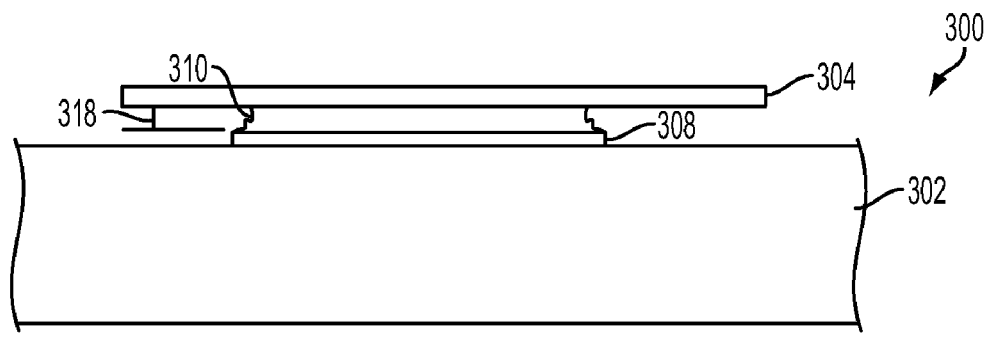
FIG. 4 is a schematic diagram depicting a side view of a temperature sensing system prior to a change in phase.
Figure 5:
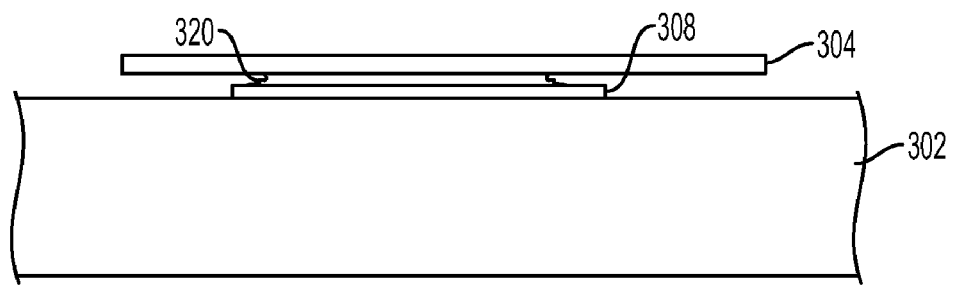
FIG. 5 is a side view of a schematic diagram of the temperature sensing system of FIG. 4 depicting a phase-change process.
Figure 6:
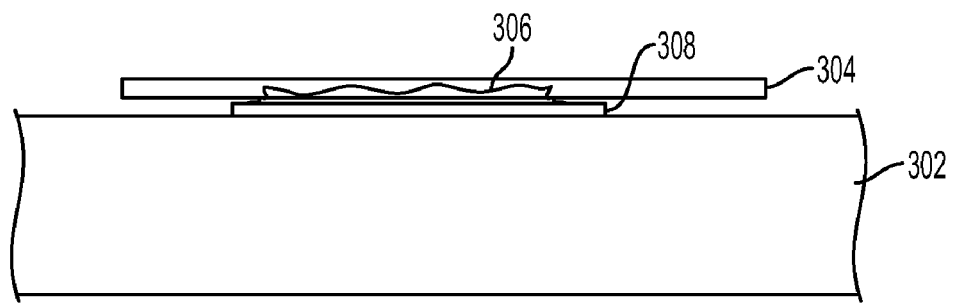
FIG. 6 is a side view of a schematic diagram of a temperature sensing system of FIG. 4 depicting transfer of a phase-change ink through a porous substrate.

Referring to FIGS. 4-6, side views of a temperature sensing system 300 are provided depicting a dynamic phase-change process at different stages of the phase-change. FIG. 4 depicts a phase-change ink used to form a mirror image pattern 310 printed on to a porous substrate 304. The substrate 304 is adhered to an object 302 by an adhesive layer 308. For clarification purposes, the porous substrate 304 and the adhesive layer 308 are depicted as being separated by a height of 318 of the phase-change ink. Referring to FIG. 5, as the object 302 is heated and achieves a predetermined temperature, the phase-change ink begins to change phase. This change in phase is demonstrated by a phase-change ink of intra-phase 320, which in the embodiment depicted in FIG. 5 results in a smaller separation between the porous substrate 304 and the adhesive layer 308. However, in other embodiments, the phase-change ink of intra-phase 320 can result in larger separations between the porous substrate 304 and the adhesive layer 308, as the change in the phase occurs.

Referring to FIG. 6, the phase-change ink has completely changed phase and is depicted as having bled through the substrate 304 to provide the displayed image pattern 306. In the embodiment of FIG. 6, the phase-change ink is shown to have completely infused into the porous substrate 304. This is indicated by the complete collapse of the porous substrate 304 on to the adhesive layer 308. However, in one embodiment, the phase-change ink can be configured to partially infuse into the porous substrate 304 and to therefore maintain some of the initial separation indicated by reference numeral 318.

It will be appreciated that various of the above-disclosed and other features, and functions, or alternatives thereof, may be desirably combined into many other different systems or applications. A few of the alternative implementations may comprise various combinations of the methods and techniques described. Various presently unforeseen or unanticipated alternatives, modifications, variations, or improvements therein may be subsequently made by those skilled in the art, which are also intended to be encompassed by the following claims.

The invention claimed is:

1. An apparatus for indicating temperature of an object, comprising:
   a porous substrate having perforations that are configured to enable steam to be released through the porous substrate from a first side of the porous substrate to a second side of the porous substrate;
   a mirror image of a first image pattern printed with a first phase-change ink having a first phase change temperature on the first side of the porous substrate; and
   an adhesive layer applied to the first side of the porous substrate to enable the first side of the porous substrate to be affixed to an object to place the first image pattern between the object and the first side of the porous substrate.

2. The apparatus of claim 1, wherein the phase-change ink is hydrophobic.

3. The apparatus of claim 1 further comprising:
   a mirror image of a second image pattern printed with a second phase-change ink having a second phase change temperature on the first side of the porous substrate, the first phase change temperature being less than the second phase change temperature.

4. The apparatus of claim 1, wherein the first phase change ink is colored black.

5. The apparatus of claim 1, wherein the mirror image of the first image pattern is printed with at least two phase change inks having a same phase change temperature and the phase change inks used to print the mirror image having different colors.

6. The apparatus of claim 1 further comprising:
   a thermally insulating layer disposed between the phase-change ink and the adhesive layer.

7. A method for manufacturing a temperature indicating object comprising:
   printing a first phase-change ink on a first side of a porous substrate to form a mirror image of a first image pattern;
   perforating the porous substrate to enable steam at the first side of the porous substrate to be released through the porous substrate to a second side of the porous substrate;
   applying adhesive to the first side of the porous substrate;
   affixing the porous substrate to an object with the adhesive, the mirror image printed on the first side being interposed between the porous substrate and the object.

8. The method of claim 7, wherein the first phase-change ink is a hydrophobic phase-change ink.

9. The method of claim 7 further comprising:
   printing a mirror image of a second image pattern with a second phase-change ink having a second phase change temperature on the first side of the porous substrate before application of the adhesive, the first phase change temperature being less than the second phase change temperature.

10. The method of claim 7, wherein the first phase change ink is colored black.

11. The method of claim 7, the printing of the mirror image of the first image pattern further comprising:
    printing the mirror image of the first image pattern with at least two phase change inks having a same phase change temperature and the phase change inks used to print the mirror image having different colors.

12. The method of claim 7 wherein the adhesive layer is applied to an area of the porous substrate outside of the mirror image printed on the porous substrate.

13. The method of claim 7 wherein the adhesive layer is applied over the mirror image printed on the porous substrate.

14. The method of claim 13 further comprising:
    disposing a thermally insulating layer between the phase-change ink and the adhesive layer.

15. The method of claim 7 further comprising:
    disposing a thermally insulating layer between the adhesive layer and the object.

* * * * *